United States Patent
Tarusawa et al.

(10) Patent No.: US 7,669,931 B2
(45) Date of Patent: Mar. 2, 2010

(54) SEAT RECLINING MECHANISM

(75) Inventors: Makoto Tarusawa, Fuchu-cho (JP);
Yasukazu Oki, Fuchu-cho (JP);
Toshinori Hayashi, Fuchu-cho (JP)

(73) Assignee: Delta Kogyo Co., Ltd (JP)

( * ) Notice: Subject to any disclaimer, the term of this patent is extended or adjusted under 35 U.S.C. 154(b) by 0 days.

(21) Appl. No.: 12/190,630

(22) Filed: Aug. 13, 2008

(65) Prior Publication Data
US 2009/0243360 A1 Oct. 1, 2009

(30) Foreign Application Priority Data
Apr. 1, 2008 (JP) .............................. 2008-095215

(51) Int. Cl.
*B60N 2/235* (2006.01)
(52) U.S. Cl. .................................. 297/367 L
(58) Field of Classification Search ................ 297/366, 297/367
See application file for complete search history.

(56) References Cited

U.S. PATENT DOCUMENTS

| | | | |
|---|---|---|---|
| 6,715,835 B2 * | 4/2004 | Hoshihara et al. | 297/366 |
| 6,758,525 B2 * | 7/2004 | Uramichi | 297/366 |
| 6,908,156 B1 * | 6/2005 | Park et al. | 297/366 |
| 7,100,987 B2 * | 9/2006 | Volker et al. | 297/367 |
| 7,150,502 B2 * | 12/2006 | Toba et al. | 297/367 |
| 7,261,379 B2 * | 8/2007 | Volker et al. | 297/367 |
| 2002/0140267 A1 | 10/2002 | Ikegaya et al. | |
| 2005/0035640 A1 | 2/2005 | Shinozaki | |
| 2005/0146187 A1 * | 7/2005 | Volker et al. | 297/369 |
| 2005/0236880 A1 | 10/2005 | Kojima | |
| 2006/0170269 A1 * | 8/2006 | Oki | 297/367 |
| 2008/0001458 A1 | 1/2008 | Hoshihara et al. | |
| 2008/0073962 A1 * | 3/2008 | Wahls et al. | 297/367 |

FOREIGN PATENT DOCUMENTS

| | | |
|---|---|---|
| EP | 1 245 435 | 10/2002 |
| EP | 1 591 303 | 11/2005 |
| JP | 2001-17259 | 1/2001 |
| JP | 2004-154585 | 6/2004 |
| WO | WO 2006/011649 | 2/2006 |

* cited by examiner

*Primary Examiner*—Peter R. Brown
(74) *Attorney, Agent, or Firm*—Gerald E. Hespos; Anthony J. Casella

(57) ABSTRACT

Disclosed is a seat reclining mechanism, which is designed to be mounted to a seat cushion and a seat back so as to allow the seat back to be reclined. The seat reclining mechanism comprises a guide bracket and an internal gear member coupled to the guide bracket in a rotatable manner about a rotation axis thereof with respect to the guide bracket and formed with internal teeth along a circle having a center on the rotation axis. A plurality of lock gear members is disposed between the guide bracket and the internal gear member. A fitting portion is provided in either one of the guide bracket and the internal gear member. A rotatable cam is rotatably supported by the fitting portion.

2 Claims, 12 Drawing Sheets

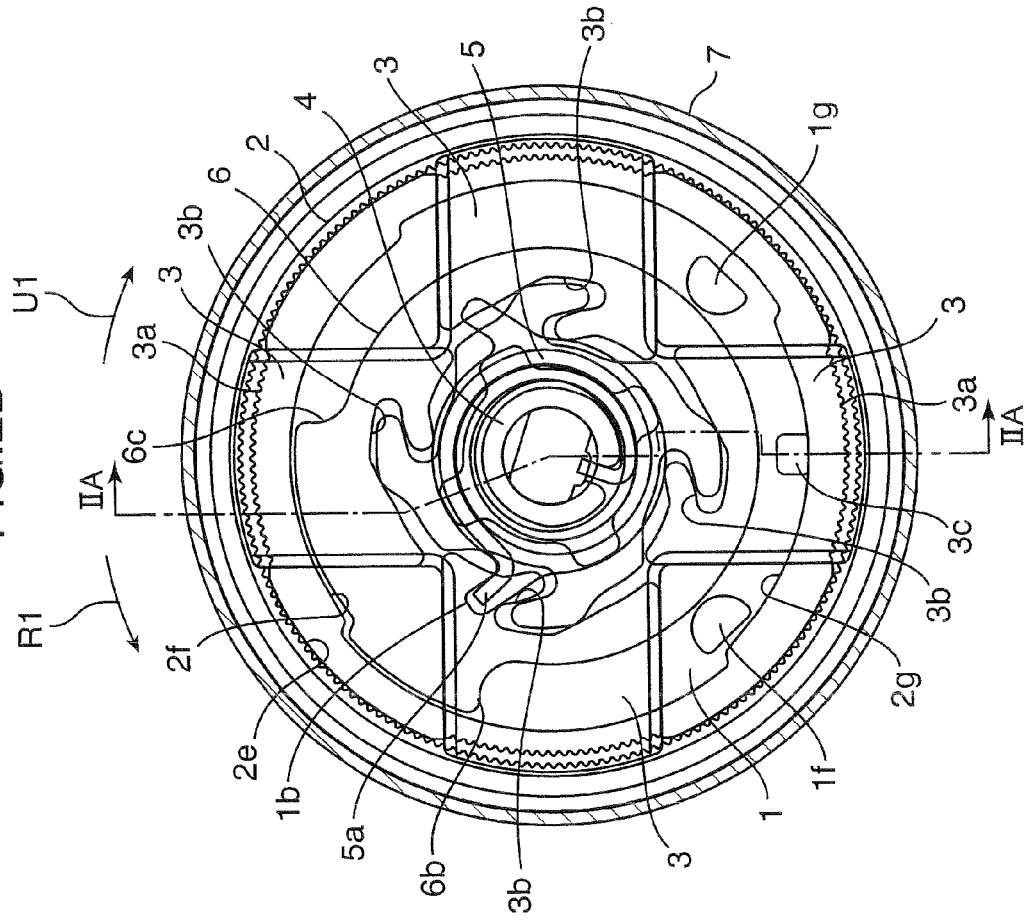
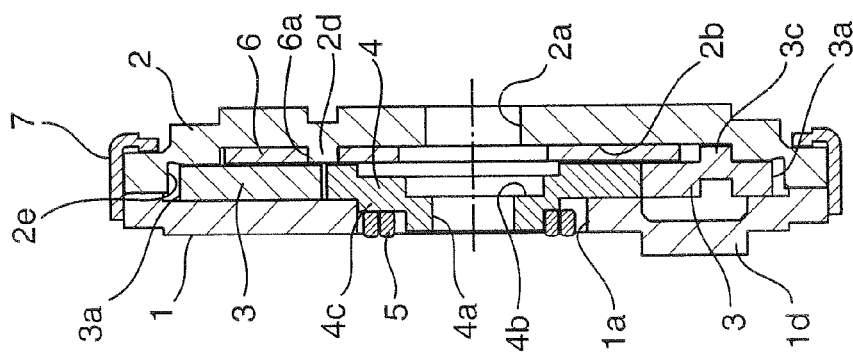

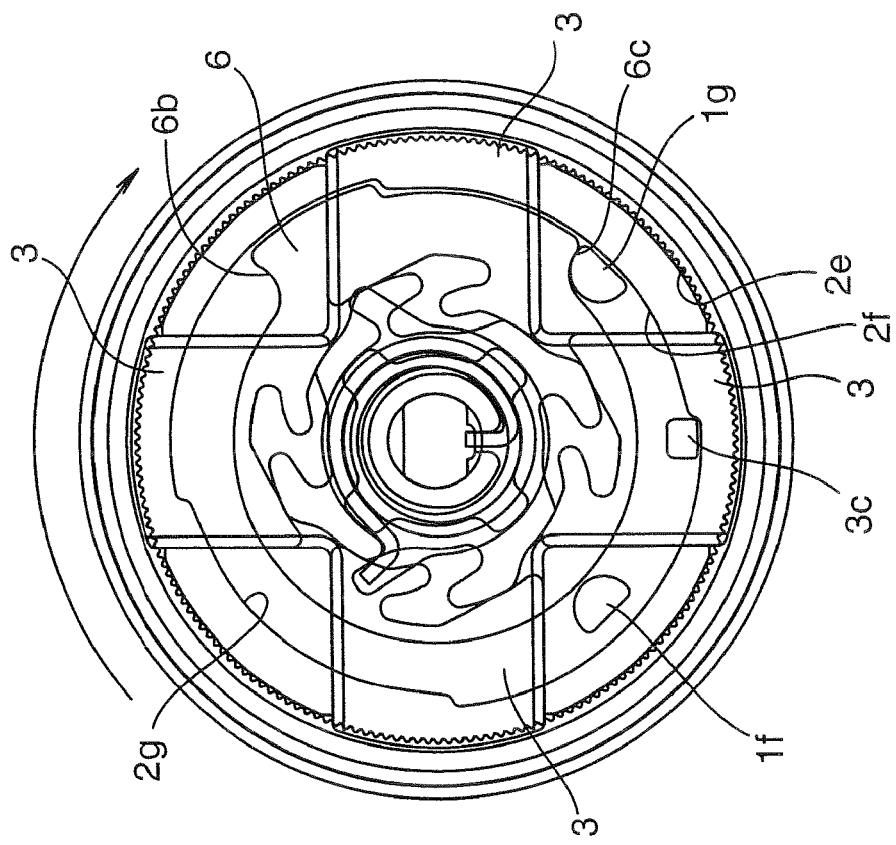
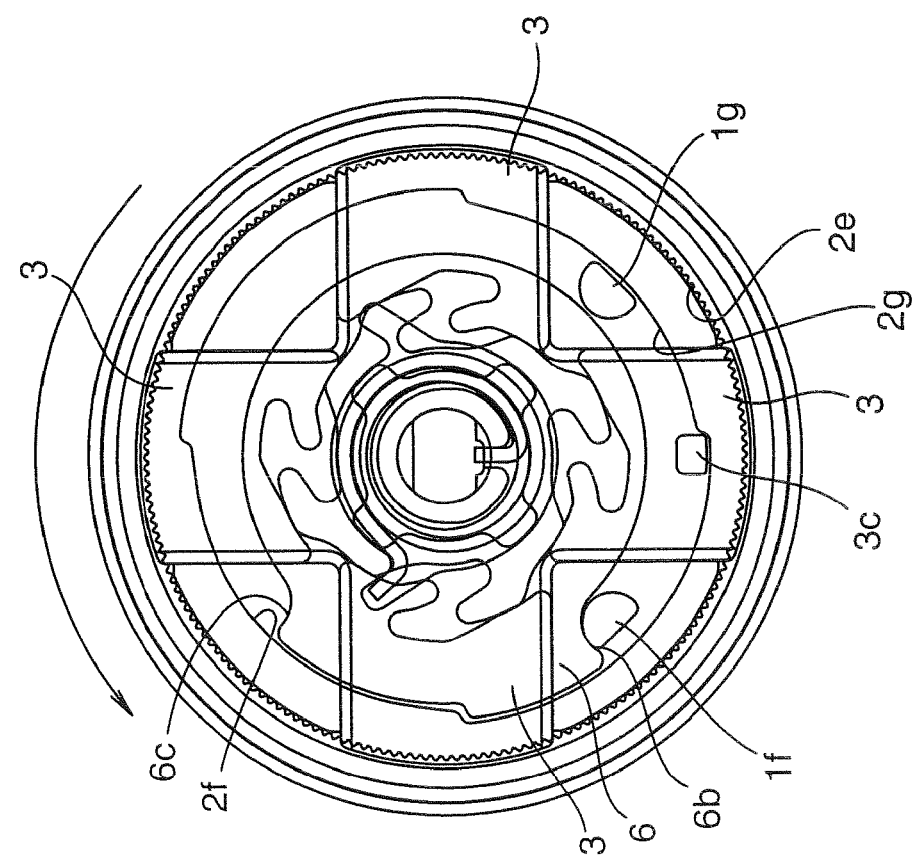

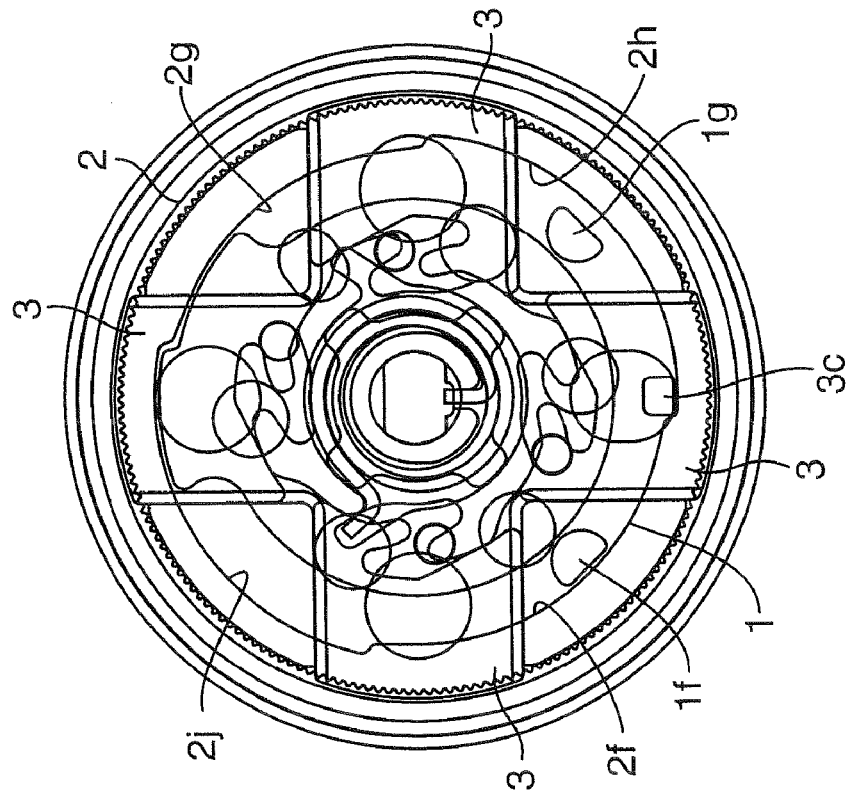
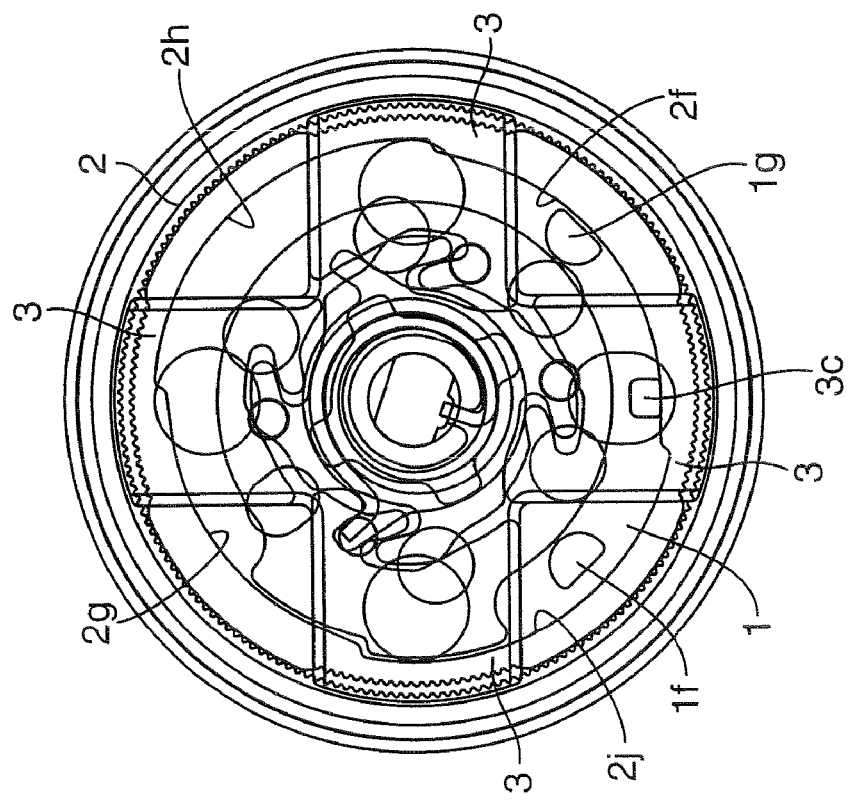

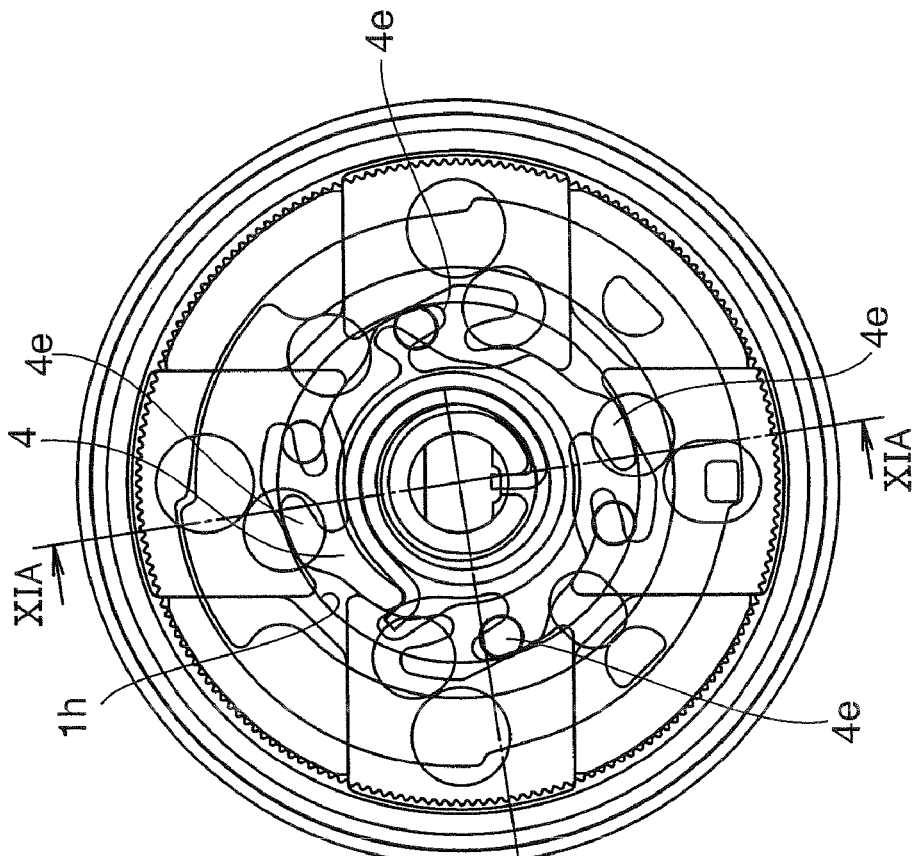
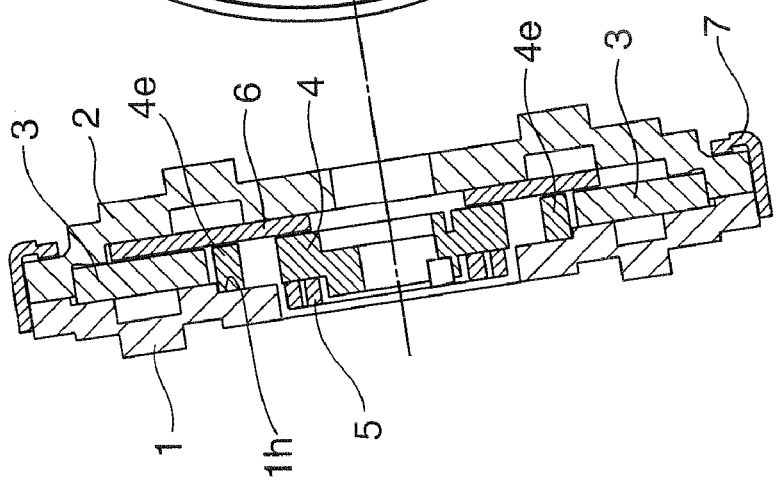

SEAT RECLINING MECHANISM

BACKGROUND OF THE INVENTION

1. Field of the Invention

The present invention relates to a seat reclining mechanism.

2. Description of the Related Art

Heretofore, there has been known a seat reclining mechanism designed to be mounted to a seat cushion and a seat back so as to allow the seat back to be reclined. JP 2001-017259A and JP 2004-154585A disclose a reclining mechanism which comprises a guide bracket adapted to be mounted to either one of a seat cushion and a seat back, an internal gear member (i.e., internally-toothed gear member) adapted to be mounted to a remaining one of the seat cushion and the seat back, a plurality of lock gear members disposed between the guide bracket and the internal gear member and adapted to be slidingly guided in a radial direction, a rotatable cam adapted to move the lock gear members in both a lock direction causing the lock gear members to be brought into engagement with the internal gear member and an unlock direction causing the lock gear members to be released from the engagement with the internal gear member, and a lock spring biasing the rotatable cam in a lock-causing rotation direction.

In this mechanism, when an operator operates an operation lever to rotate the rotatable cam in a direction opposite to the lock-causing rotation direction, the lock gear members are moved in the unlock direction through a circular lever (actuating plate), and released from the engagement with the internal gear member. Thus, the seat back can be forwardly or rearwardly inclined. Then, when the operator releases his/her hand from the operation lever, the rotatable cam is rotated in the lock-causing rotation direction by a biasing force of the lock spring, and the lock gear members are moved in the lock direction and brought into engagement with the internal gear member. Thus, the seat back is locked at an intended inclined position.

In the above mechanism, if a center of the rotatable cam is displaced from a normal position due to the biasing force of the lock spring, the lock gear members are likely to become unable to be evenly moved, which leads to instability in lock function of the lock gear members.

For this reason, the rotatable cam is integrated with an operation member, such as an operation rod connected to the operation lever, and the operation member supported by a bearing member, such as a knuckle bracket, provided outside the reclining mechanism, so as to perform centering of the rotatable cam.

However, in the structure designed to support the operation member by the bearing member, such as a knuckle bracket, the operation member and the bearing member have to be prepared with a high degree of dimensional accuracy to cause a problem about an increase in cost.

SUMMARY OF THE INVENTION

In view of the above problem, it is an object of the present invention to provide a low-cost seat reclining mechanism.

In order to achieve this object, the present invention provides a seat reclining mechanism designed to be mounted to a seat cushion and a seat back so as to allow the seat back to be reclined. The seat reclining mechanism comprises: a guide bracket adapted to be mounted to either one of the seat cushion and the seat back; an internal gear member adapted to be mounted to a remaining one of the seat cushion and the seat back, wherein the internal gear member is coupled to the guide bracket in a rotatable manner about a rotation axis thereof with respect to the guide bracket, and formed with internal teeth along a circle having a center on the rotation axis; a plurality of lock gear members disposed between the guide bracket and the internal gear member to extend radially from the rotation axis, wherein each of the lock gear members is formed with external teeth meshingly engageable with the internal teeth, and supported by the guide bracket in such a manner as to be slidable in both a lock direction causing the external teeth to be brought into meshing engagement with the internal teeth and an unlock direction causing the external teeth to be released from the meshing engagement with the internal teeth; a fitting portion provided in either one of the guide bracket and the internal gear member; a rotatable cam rotatably supported by the fitting portion, and adapted to be rotatable in both a lock-causing rotation direction causing the lock gear members to be slidingly moved in the lock direction and an unlock-causing rotation direction causing the lock gear members to be slidingly moved in the unlock direction; and a lock spring biasing the rotatable cam in the lock-causing rotation direction.

BRIEF DESCRIPTION OF THE DRAWINGS

FIG. 2A is a sectional view showing the mechanism, taken along the line IIA-IIA in FIG. 2B.

FIG. 2B is a see-through front view showing the mechanism, when viewed from the side of an internal gear member.

FIG. 7A is a see-through front view showing the mechanism, when viewed from the side of the internal gear member, wherein a forwardmost-inclination stopper portion is in contact with a forwardmost-inclination stopper protrusion.

FIG. 7B is a see-through front view showing the mechanism, when viewed from the side of the internal gear member, wherein a rearwardmost-inclination stopper portion is in contact with a rearwardmost-inclination stopper protrusion.

FIG. 9A is a see-through front view showing a reclining mechanism of a type designed to keep a seat back from being locked at a forwardmost inclined position, when viewed from the side of an internal gear member, in a state when the seat back is set at the forwardmost inclined position without being locked.

FIG. 9B is a see-through front view showing the mechanism in FIG. 9A, when viewed from the side of an internal gear member, in a state when the seat back is locked at an initial locked position, e.g., an upright position.

FIG. 11A is a sectional view showing a reclining mechanism as a second modification of the embodiment illustrated in FIG. 1, taken along the line XIA-XIA in FIG. 11B.

FIG. 11B is a see-through front view showing the mechanism as the second modification, when viewed from the side of an internal gear member.

DETAILED DESCRIPTION OF THE PREFERRED EMBODIMENTS

With reference to the drawings, the present invention will now be specifically described based on a preferred embodiment thereof.

Figure 1:
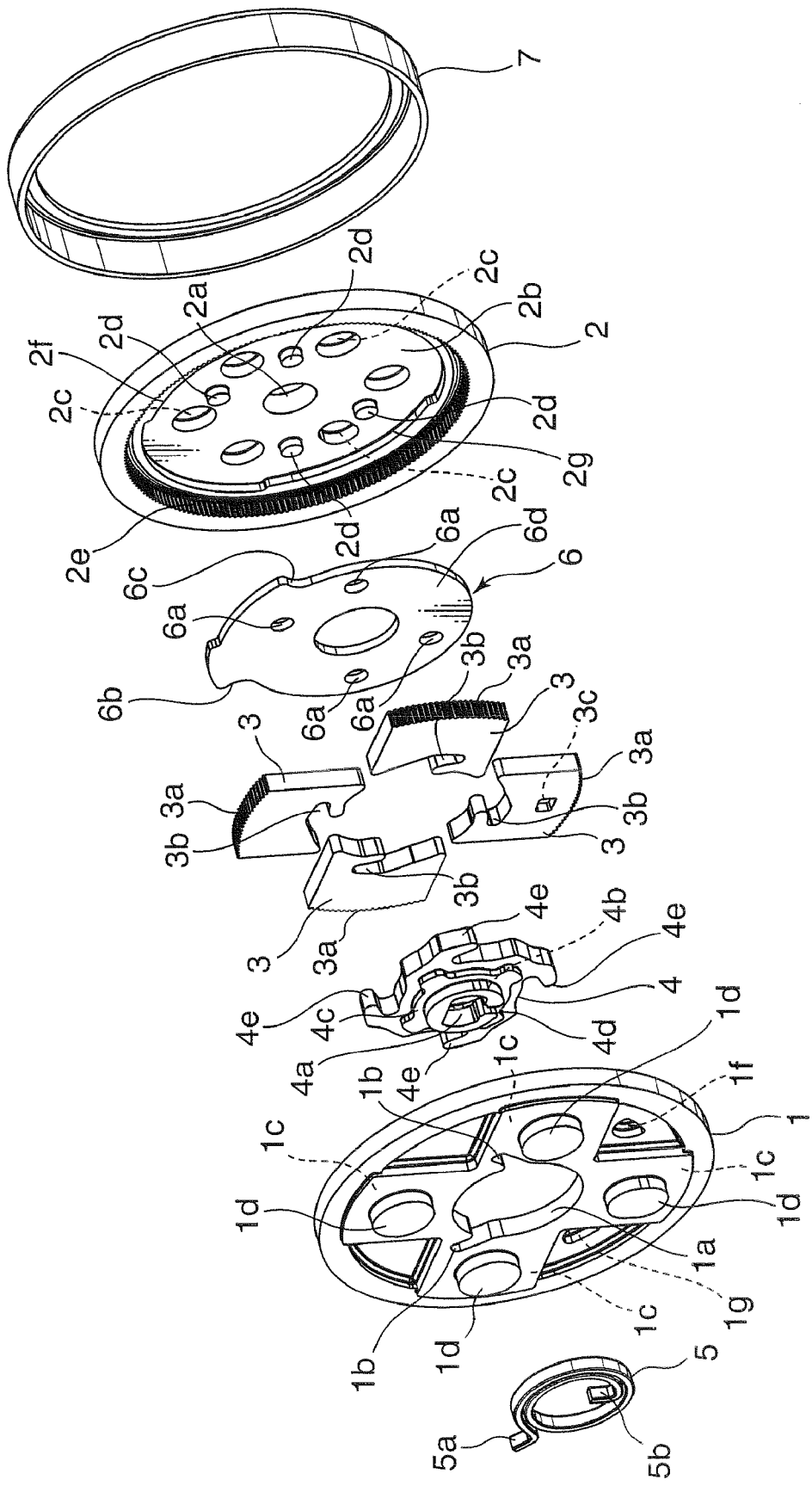
FIG. 1 is an exploded perspective view showing a reclining mechanism according to one embodiment of the present invention.

As shown in FIGS. 1, 2A and 2B, a seat reclining mechanism according to one embodiment of the present invention is designed to be mounted to a seat cushion and a seat back of a seat so as to allow the seat back to be reclined. The mechanism comprises a guide bracket 1 adapted to be mounted to the seat cushion, an internal gear member 2 adapted to be mounted to the seat back, four lock gear members 3, a rotatable cam 4, a lock spring 5, a stopper plate 6, and a ring 7.

Figure 3A:
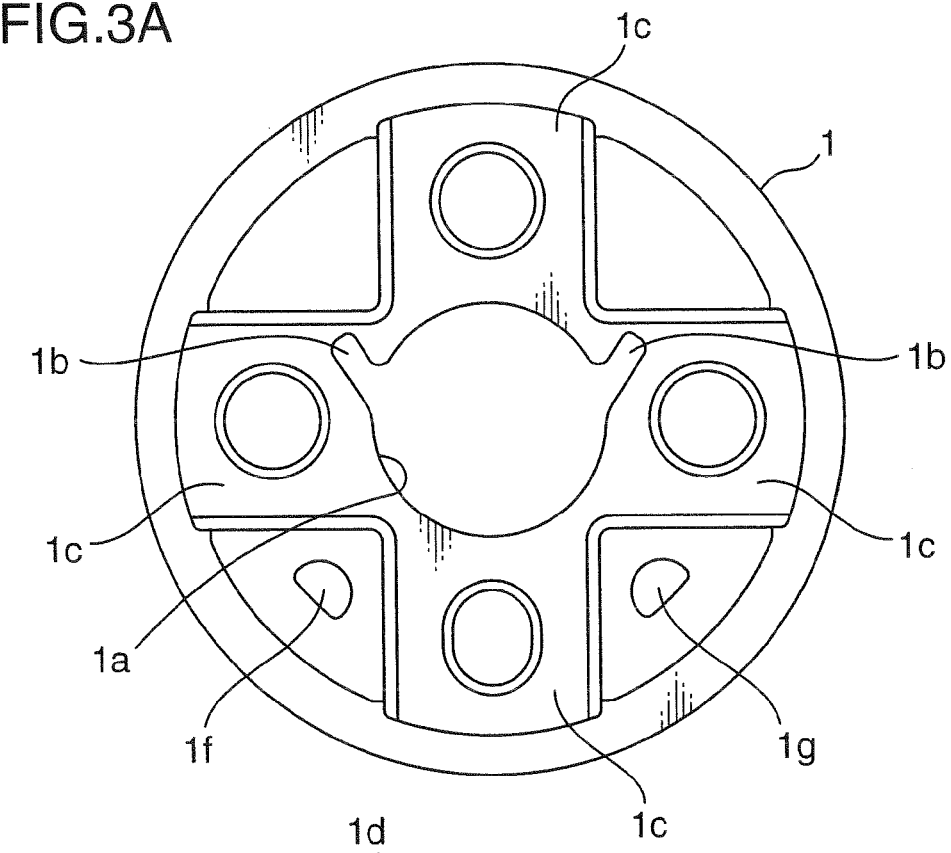
FIG. 3A is a front view of a guide bracket in the mechanism, when viewed from the side of an inner surface thereof.
Figure 3B:
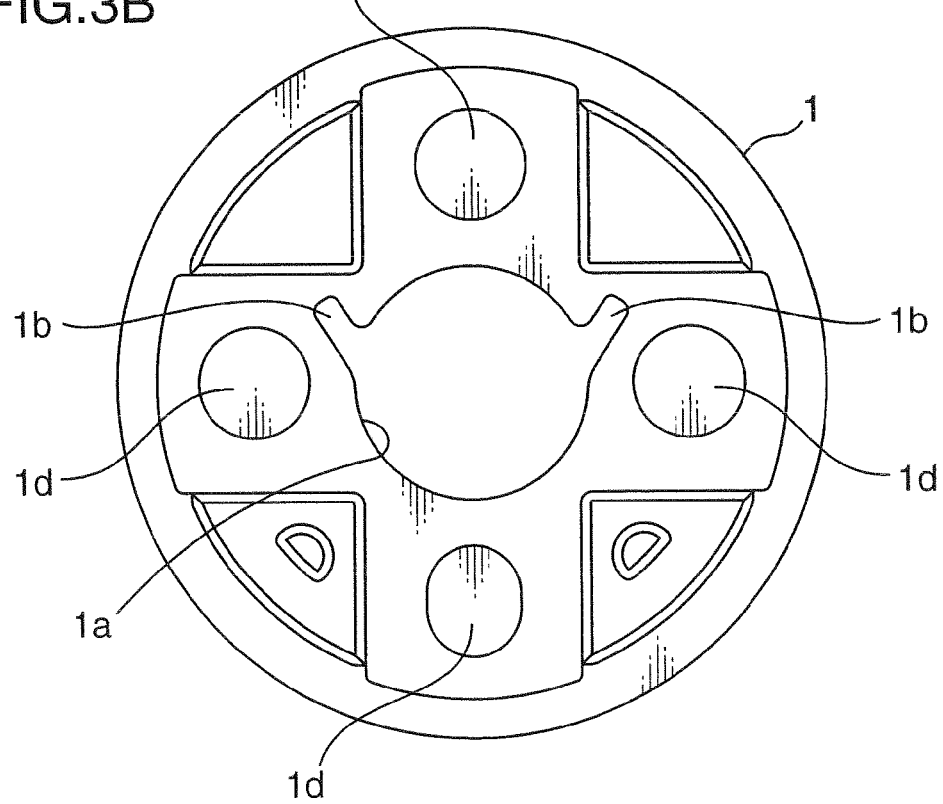
FIG. 3B is a back view showing the guide bracket, when viewed from the side of an outer surface thereof.

As shown in FIGS. 3A and 3B, the guide bracket 1 is formed in a circular disk shape. The guide bracket 1 has a fitting portion which comprises a fitting hole 1a concentrically formed in the guide bracket 1. The fitting hole 1a includes a cutout 1b formed to lock an outer end 5a of the lock spring 5 which is a spiral spring.

The guide bracket 1 has four guide grooves 1c which are formed in an inner surface thereof through a half blanking process to extend from an inner peripheral edge of the fitting hole 1a in a radially outward direction of the guide bracket 1. The four guide grooves 1c are arranged to form a cross shape, and the fitting hole 1a is formed in a central region of the guide grooves 1c. The inner surface of the guide bracket 1 means a surface of the guide bracket 1 located in opposed relation to the internal gear member 2.

Each of the guide grooves 1c has a columnar-shaped convex portion 1d formed through a half blanking process to protrude outwardly from an outer surface of the guide bracket 1. The convex portions 1d serve as a positioning means to be used when the guide bracket 1 is mounted to the seat cushion.

The guide bracket 1 also has a semi-columnar-shaped forwardmost-inclination stopper protrusion 1f and a semi-columnar-shaped rearwardmost-inclination stopper protrusion 1g which are formed, respectively, in two regions defined between a horizontally-extending right one and a downwardly-extending one of the four guide grooves 1c and between a horizontally-extending left one and the downwardly-extending one of the four guide grooves 1c in FIG. 3A, to protrude inwardly from the inner surface the guide bracket 1. These stopper protrusions 1f, 1g are formed through a half blanking process. The forwardmost-inclination stopper protrusion 1f and the rearwardmost-inclination stopper protrusion 1g are adapted to come into contact with the stopper plate 6 when the seat back is moved to a forwardmost inclined position and a rearwardmost inclined position, respectively, as will be described in detail later.

Figure 4A:
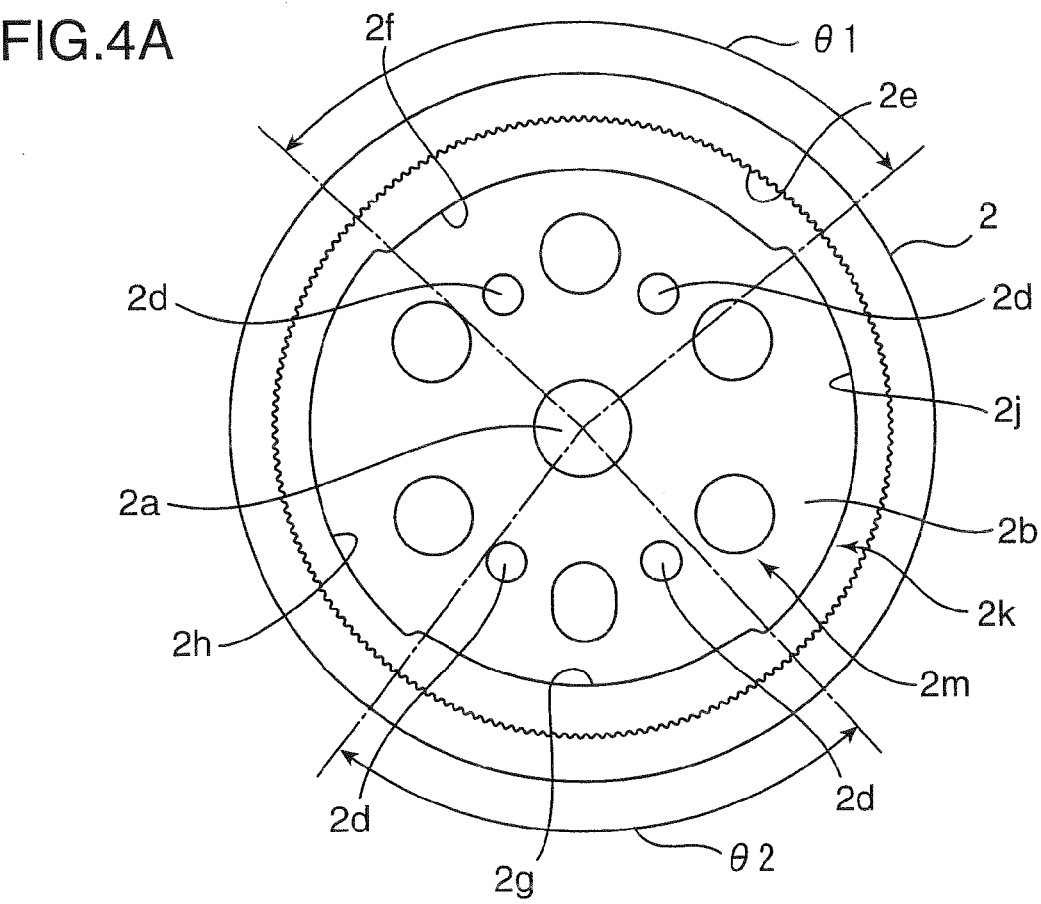
FIG. 4A is a front view showing the internal gear member in the mechanism, when viewed from the side of an inner surface thereof.
Figure 4B:
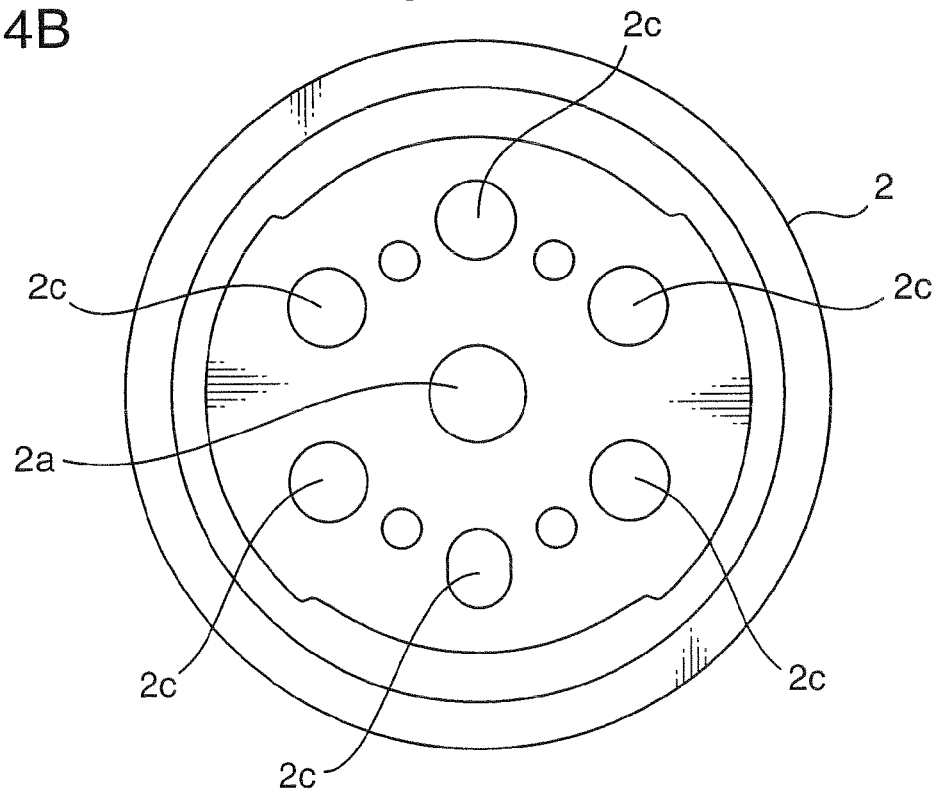
FIG. 4B is a back view showing the internal gear member, when viewed from the side of an outer surface thereof.

As shown in FIGS. 4A and 4B, the internal gear member 2 is formed in a circular disk shape. The internal gear member 2 is coupled to the guide bracket 1 in a rotatable manner about a rotation axis thereof with respect to the guide bracket 1. The center of the guide bracket 1 is located on the rotation axis of the internal gear member 2.

The internal gear member 2 has two steps of concave portions formed in an inner surface of thereof through a half blanking process. Two sidewalls constituting respective ones of the first-step concave portion 2k and the second-step concave portion 2m are formed, respectively, in a circular shape and a circular arc shape in front view. Each of the circular-shaped sidewall and the circular arc-shaped sidewall are formed in concentric relation with an after-mentioned through-hole 2a. The inner surface of the internal gear member 2 means a surface of the internal gear member 2 located in opposed relation to the guide bracket 1.

The sidewall of the first-step concave portion 2k has internal teeth 2e formed over the entire inner peripheral surface thereof. The internal teeth 2e are formed through a half blanking process.

The second-step concave portion 2m has a bottom wall 2b formed with a through-hole 2a having a diameter less than that of the fitting hole 1a of the guide bracket 1, and six columnar-shaped convex portions 2c each protruding outwardly from an outer surface of the internal gear member 2, and four lock protrusions 2d each protruding inwardly from the inner surface of the internal gear member 2. The through-hole 2a has a center located on the rotation axis of the internal gear member 2. The convex portions 2c serve as a positioning means to be used when the internal gear member 2 is mounted to the seat back. The lock protrusions 2d serve as a means to position and lock the stopper plate 6, as will be described in detail later. Each of the convex portions 2c and the lock protrusions 2d are formed through a half blanking process.

The sidewall of the second-step concave portion 2m is formed to have an inner peripheral surface which comprises a first free-zone arc portion 2f, a first lock-zone arc portion 2h, a second free-zone arc portion 2g, and a second lock-zone arc portion 2j. Each of the arc portions 2f, 2h, 2g, 2j has a center located on the rotation axis of the internal gear member 2.

The first free-zone arc portion 2f is located in opposed relation to the second free-zone arc portion 2g, and the first and second free-zone arc portions 2f, 2g are formed along a common circle. The first lock-zone arc portion 2h is located in opposed relation to the second lock-zone arc portion 2j, and the first and second lock-zone arc portions 2h, 2j are formed along a common circle.

The first free-zone arc portion 2f has an arc length greater than that of the second free-zone arc portion 2g. That is, a center angle θ1 of the first free-zone arc portion 2f is greater than a center angle θ2 of the second free-zone arc portion 2g. Each of the free-zone arc portions 2f, 2g has a curvature radius less than that of each of the lock-zone arc portions 2h, 2j.

The free-zone arc portions 2f, 2g are formed to allow an after-mentioned protrusion 3c of one of the lock gear members 3 to be in contact with either one thereof when the lock gear members 3 are located at a position where an after-mentioned external teeth 3a of the lock gear members 3 are not in meshing engagement with the internal teeth 2e of the internal gear member 2. Further, the lock-zone arc portions 2h, 2j are formed to allow the after-mentioned protrusion 3c to be in contact with either one thereof when the lock gear members 3 are located at a position where the after-mentioned external teeth 3a are in meshing engagement with the internal teeth 2e.

As shown in FIGS. 1, 2A and 2B, the four lock gear members 3 are disposed between the guide bracket 1 and the internal gear member 2 to extend radially from the rotation axis in a cross-like pattern. That is, the four lock gear members are arranged at intervals of about 90 degrees. This provides enhanced stability and safety in a locked state.

Figure 5A:
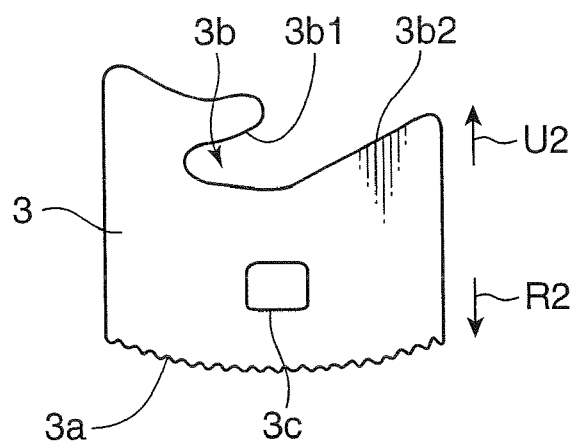
FIG. 5A is a front view showing a lock gear member having a protrusion, which is one of a plurality of lock gear members in the mechanism.
Figure 5B:
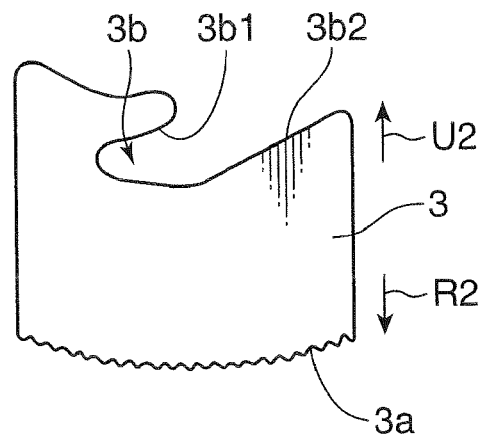
FIG. 5B is a front view showing a lock gear member devoid of the protrusion, which is one of the plurality of lock gear members.

As shown in FIGS. 5A and 5B, each of the lock gear members 3 has an arc-shaped surface located in opposed relation to the internal teeth 2e of the internal gear member 2 and formed with external teeth 3a meshingly engageable with the internal teeth 2e. Each of the lock gear members 3 is supported by a corresponding one of the guide grooves 1c of the guide bracket 1 in such a manner as to be slidable in both a lock direction R2 causing the external teeth 3a to be brought into meshing engagement with the internal teeth 2e and an unlock direction U2 causing the external teeth 3a to be released from the meshing engagement with the internal teeth 2e. Each of the lock gear members 3 has an engagement groove 3b formed on a leading side of the unlock direction U2 to allow a corresponding one of after-mentioned engagement pawls 4e of the rotatable cam 4 to be brought into engagement therewith. The engagement groove 3b is formed in a shape which allows the after-mentioned engagement pawl 4e to be inserted thereinto when the rotatable cam 4 is rotated in an after-mentioned unlock-causing rotation direction U1. As shown in FIG. 5A, one of the four lock gear members 3 has a protrusion 3c protruding toward the internal gear member 2. The protrusion 3c is formed through a half blanking process.

Figure 5C:
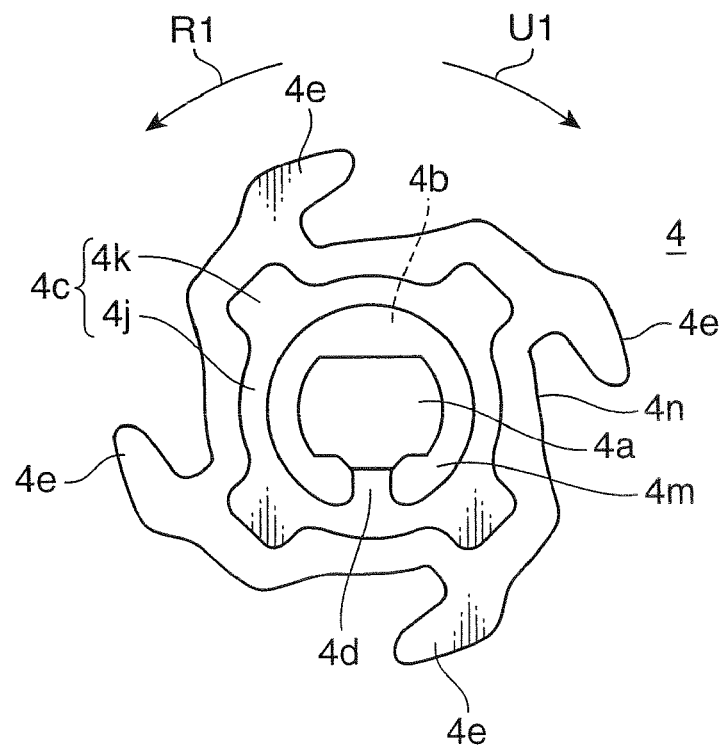
FIG. 5C is a front view showing a rotatable cam in the mechanism.

As shown in FIGS. 1, 2A and 5C, the rotatable cam 4 is rotatably supported by the fitting hole 1a of the guide bracket 1, and adapted to be rotatable in both a lock-causing rotation direction R1 and an unlock-causing rotation direction U1 illustrated in FIG. 5C. The rotatable cam 4 has a cam body 4n, four engagement pawls 4e protruding from the cam body 4n in the unlock-causing rotation direction U1, a fitting boss 4c protruding from the cam body 4n toward the guide bracket 1, and a raised portion 4m protruding from the fitting boss 4c toward the guide bracket 1.

The rotatable cam 4 has two steps of recesses concaved toward the guide bracket 1, when viewed from the side of the internal gear member 2. The recesses are formed through a half blanking process. The fitting boss 4c is created by forming the first-step recess, and the raised portion 4m is created by forming the second-step recess.

The rotatable cam 4 has an elongate hole 4a formed in a central region thereof to have a shape close to an oval shape. The elongate hole 4a is formed to penetrate through a bottom wall 4b of the second-step recess. Each of the fitting boss 4c, the raised portion 4m and the elongate hole 4a has a center located on the rotation axis of the internal gear member 2.

The fitting boss 4c has an annular-shaped boss body 4j, and four protrusions 4k which protrude radially from the boss body 4j toward an inner peripheral surface of the fitting hole 1a in a cross-like pattern, in such a manner that an outer peripheral surface of each of the protrusions 4k comes into slide contact with the inner peripheral surface of the fitting hole 1a. In this manner, the fitting boss 4c is fitted in (roughly guided by) the fitting hole 1a under a condition that the respective outer peripheral surfaces of the protrusions 4k are in contact with the inner peripheral surface of the fitting hole 1a. This provides a centering function to the reclining mechanism so as to prevent axial wobbling of the rotatable cam 4 relative to the fitting hole 1a.

For example, if the fitting boss 4c consists only of an annular-shaped boss body, the boss body (i.e., the fitting boss 4c) will be designed to have an outer diameter approximately equal to an inner diameter of the fitting hole 1a in which the boss body is fitted. In this case, the outer diameter of the boss body is necessarily set at a value less than an outer diameter of the cam body 4n. By contrast, when the fitting boss 4c comprises the boss body 4j and the protrusions 4k, and each of the protrusions is formed to extend toward a root of a corresponding one of the engagement pawls 4e, as in this embodiment, the fitting boss has an outer diameter equal to a distance between the rotation axis and the outer peripheral surface of each of the protrusions 4k, so that each of the outer diameter of the fitting boss 4c and the inner diameter of the fitting hole 1a can be set at a value greater than the outer diameter of the cam body 4n. This makes it possible to more stably rotate the rotatable cam 4 in its fitted state.

The raised portion 4m is formed with a cutout 4d for locking an inner end 5b of the lock spring 5. The outer end 5a of the lock spring 5 is locked by the cutout 1b of the guide bracket 1, as mentioned above. Thus, the lock spring 5 biases the rotatable cam 4 in the lock-causing rotation direction R1.

An operation member, such as an operation rod connected to an operation lever or the like, penetrating through the fitting hole 1a of the guide bracket 1 and the through-hole 2a of the internal gear member 2, is fitted in the elongate hole 4a in a non-rotatable manner relative thereto. Thus, the rotatable cam 4 can be rotated by the operation member. The operation member is not supported by the guide bracket 1 and the internal gear member 2.

The four engagement pawls 4e are formed to protrude in a direction approximately tangential to a circle having a center on the rotation axis of the internal gear member 2, and arranged at approximately even intervals.

Figure 6A:
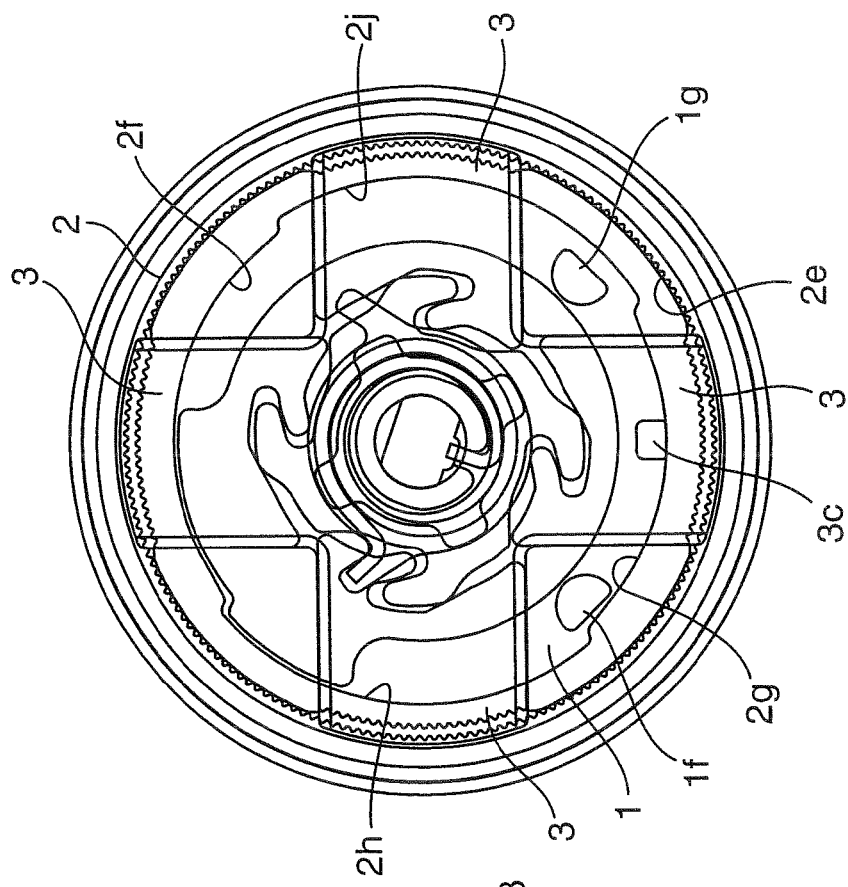
FIG. 6A is a see-through front view showing the mechanism, when viewed from the side of the internal gear member, in a state after a seat back is set at an initial locked position.

As shown in FIGS. 5A, 5B and 5C, when the rotatable cam 4 is rotated in the lock-causing rotation direction R1, the engagement pawls 4e push respective outside walls 3b2 of the engagement grooves 3b in the lock direction R2. Thus, the lock gear members 3 are slidingly moved in the lock direction R2, so that the external teeth 3a of the lock gear members 3 are brought into meshing engagement with the internal teeth 2e of the internal gear member 2 (see FIG. 6A).

When the rotatable cam 4 is rotated in the unlock-causing rotation direction U1, the engagement pawls 4a are brought into engagement with the respective engagement grooves 3b to pull respective inside walls 3b1 of the engagement grooves 3b in the unlock direction U2. Thus, the lock gear members 3 are slidingly moved in the unlock direction U2, so that the external teeth 3a of the lock gear members 3 are moved apart from the internal teeth 2e of the internal gear member 2 to release the meshing engagement between the external teeth 3a and the internal teeth 2e (see FIGS. 2B and 6B).

As shown in FIGS. 1, 7A and 7B, the stopper plate 6 is formed with four catch holes 6a engageable with the respective lock protrusions 2d provided on the inner surface of the internal gear member 2. Thus, the stopper plate 6 is positioned and locked relative to the internal gear member 2. The stopper plate 6 has a forwardmost-inclination stopper portion 6b (see FIG. 7A) adapted to be brought into contact with the forwardmost-inclination stopper protrusion 1f of the guide bracket 1 when the seat back is moved to a forwardmost inclined position, and a rearwardmost-inclination stopper portion 6c (see FIG. 7B) adapted to be brought into the rearwardmost-inclination stopper protrusion 1g of the guide bracket 1 when the seat back is moved to a rearwardmost inclined position. The stopper portions 6b, 6c is formed by respective circumferentially opposite edges of an arc-shaped protrusion protruding radially from a plate body 6d of the stopper plate 6.

As above, the forwardmost-inclination stopper protrusion 1f and the rearwardmost-inclination stopper protrusion 1g are formed in the guide bracket 1, and the stopper plate 6 is fixed to the internal gear member 2, so that a stopper can be incorporated in the reclining mechanism. This makes it possible to prevent an increase in outside dimension of a seat so as to provide enhanced flexibility of seat layout. In addition, a need for a large-size stopper bracket can be eliminated to facilitate a reduction in weight of a seat.

The forwardmost-inclination stopper protrusion 1f and the rearwardmost-inclination stopper protrusion 1g are formed in the guide bracket 1 through a half blanking process to facilitate a reduction in cost. It is understood that each of the forwardmost-inclination stopper protrusion 1f and the rearwardmost-inclination stopper protrusion 1g may be prepared as a separate component. In this case, the stopper protrusions 1f, 1g can be attached to the guide bracket 1 or the internal gear member 2 after preparing the guide bracket 1 or the internal gear member 2, so that a stopper position can be readily changed in the event of design changes for a configuration or mounting position of a reclining mechanism.

The ring 7 is fitted on an outer periphery of the guide bracket 1 and the internal gear member 2 after the lock gear members 3, the rotatable cam 4, the stopper plate 6 are installed between the guide bracket 1 and the internal gear member 2. In this manner, the reclining mechanism is unitized. The lock spring 5 can be installed from the fitting hole 1a of the guide bracket 1 to allow the outer end 5a and the inner end 5b to be locked by the cutout 1b of the guide bracket 1 and the cutout 4d of the rotatable cam 4, respectively.

In a process of assembling the unitized reclining mechanism to a seat, the guide bracket 1 is mounted to a seat cushion, and the internal gear member 2 is mounted to a seat back. Then, an operation member, such as an operation rod connected to an operation lever or the like, is inserted from the fitting hole 1a of the guide bracket 1, and fitted in the elongate hole 4a of the rotatable cam 4 in a non-rotatable manner relative thereto.

A relationship between respective ones of the rotatable cam 4, the lock gear members 3, and the arc portions 2f, 2g, 2h, 2j of the internal gear member 2, will be described below.

Before the lock gear members 3 are brought into meshing engagement with the internal gear member 2, the protrusion 3c of one of the lock gear members 3 is brought into contact with either one of the free-zone arc portions 2f, 2g. When the protrusion 3c is brought into contact with either one of the free-zone arc portions 2f, 2g, the lock gear members 3 are restrained, and thereby an unlocked state (lock-released state) is maintained.

The first free-zone arc portion 2f is used for a reclining mechanism of a "type designed to keep a seat back from being locked at a forwardmost inclined position". The second free-zone arc portion 2g is used for a reclining mechanism of a "type designed to lock a seat back at a forwardmost inclined position".

As shown in FIG. 4A, the first free-zone arc portion 2f has a center angle greater than that of the second free-zone arc portion 2g. For example, the center angle θ1 of the first free-zone arc portion 2f is set at 106 degree, and the center angle θ2 of the second free-zone arc portion 2g is set at 90 degree.

In a conventional seat reclining mechanism, an internal gear member is formed with only either one of the free-zone arc portions. Differently, in this embodiment, the internal gear member 2 is formed with both the first free-zone arc portion 2f and the second free-zone arc portion 2g.

Thus, in an operation of installing the lock gear members 3 between the guide bracket 1 and the internal gear member 2, an installation position of the protrusion 3c of one of the lock gear members 3 can be selected such that either one of the first free-zone arc portion 2f and the second free-zone arc portion 2g of the internal gear member 2 is located relative to the protrusion 3c. Thus, in this embodiment using the internal gear member 2, the installation position of the protrusion 3c can be changed to select either one of the type designed to keep a seat back from being locked at a forwardmost inclined position (i.e., lock free type), and the type designed to lock a seat back at a forwardmost inclined position. This makes it possible to facilitate a reduction in cost of the reclining mechanism.

Figure 8A:
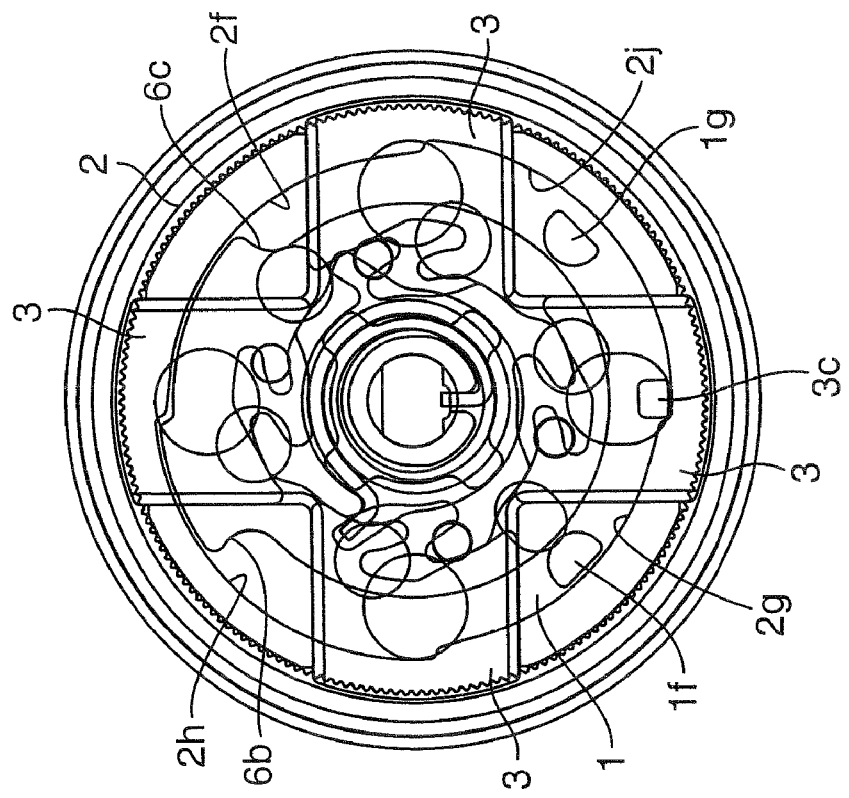
FIG. 8A is a see-through front view showing a reclining mechanism of a type designed to lock a seat back at a forwardmost inclined position, when viewed from the side of an internal gear member, in a state when the seat back is locked at the forwardmost inclined position.
Figure 8B:
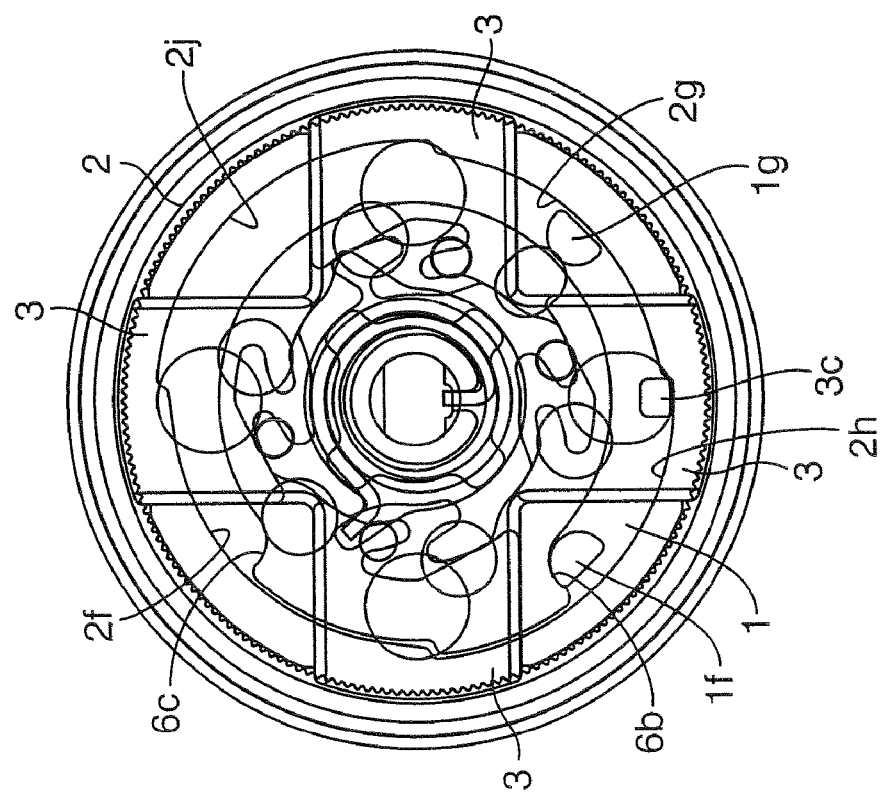
FIG. 8B is a see-through front view showing the mechanism in FIG. 8A, when viewed from the side of the internal gear member, in a state when the seat back is locked at an initial locked position, e.g., an upright position.

FIGS. 8A and 8B are front views showing the reclining mechanism set as the type designed to lock a seat back at a forwardmost inclined position, wherein FIG. 8A shows the reclining mechanism in a state when the seat back is at the forwardmost inclined position, and FIG. 8B shows the reclining mechanism in a state when the seat back is at an initial locked position (e.g., upright position) where it is initially locked after being inclined rearwardly from the forwardmost inclined position.

Figure 6B:
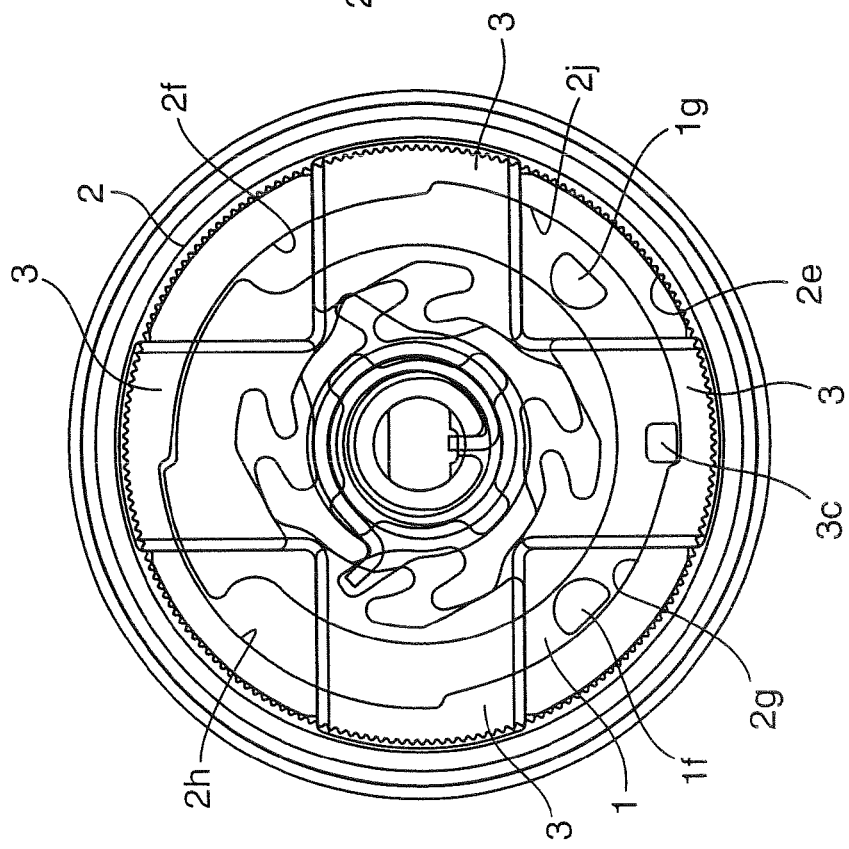
FIG. 6B is a see-through front view showing the mechanism, when viewed from the side of the internal gear member, wherein the protrusion is located on a free-zone arc portion.

In this type, as the seat back is inclined forwardly from a rearwardly inclined position, for example, from the state illustrated in FIG. 6B, the internal gear member 2 is rotated in a counterclockwise direction in FIG. 6B, and one edge of the second free-zone arc portion 2g is moved beyond the protrusion 3c to allow the protrusion 3c to be placed on the first lock-zone arc portion 2h. In conjunction with this movement, the restraint on movement of the lock gear members 3 in the lock direction R2 is released, and thereby the lock gear members 3 are slidingly moved in the lock direction R2 to allow the external teeth 3a to be brought into meshing engagement with the internal teeth 2e. Thus, the seat back is locked at the forwardmost inclined position (the state illustrated in FIG. 8A). In this state, the forwardmost-inclination stopper portion 6b of the stopper plate 6 is in contact with the forwardmost-inclination stopper protrusion 1f of the guide bracket 1.

In an operation of inclining the seat back locked at the forwardmost inclined position rearwardly, the rotatable cam 4 is rotated in the unlock-causing rotation direction U1 using the operation member to allow the engagement pawls 4e of the rotatable cam 4 to be brought into engagement with the respective engagement grooves 3b of the lock gear members 3. Thus, the lock gear members 3 are slidingly moved along the respective guide grooves 1c in the unlock direction U2, and thereby the meshing engagement between the external teeth 3a and the internal teeth 2e is released, i.e., the locked state is released. Consequently, the internal gear member 2 becomes rotatable relative to the guide bracket 1.

In this lock-released state, when the seat back is inclined rearwardly, the protrusion 3c placed on the first lock-zone arc portion 2h is moved in such a manner as to be placed on the second free-zone arc portion 2g (the state illustrated in FIG. 6B). In the state when the protrusion 3c is in contact with the second free-zone arc portion 2g, as shown in FIG. 6B, the movement of the lock gear members 3 in the lock direction R2 is restrained. Thus, the seat back can be freely inclined rearwardly or forwardly.

The seat back is further inclined rearwardly from the state illustrated in FIG. 6B, the other edge of the second free-zone arc portion 2g is moved beyond the protrusion 3c to allow the protrusion 3c to be placed on the second lock-zone arc portion 2j. In conjunction with this movement, the restraint on movement of the lock gear members 3 in the lock direction R2 is released, and thereby the lock gear members 3 are slidingly moved in the lock direction R2 to allow the external teeth 3a to be brought into meshing engagement with the internal teeth 2e. Thus, the seat back is locked at the initial locked position (e.g., upright position) (the state illustrated in FIG. 8B).

The seat back can be further inclined from the initial locked position illustrated in FIG. 8B up to a rearwardmost inclined position illustrated in FIG. 7B. During movement from the initial locked position to the rearwardmost inclined position, the protrusion 3c is placed on the second lock-zone arc portion 2j, and thereby the external teeth 4a is in meshing engagement with the internal teeth 2e, i.e., the reclining mechanism is in the locked state. Thus, in an operation of inclining the seat back rearwardly from the initial locked position to the rearwardmost inclined position, the rotatable cam 4 is rotated in the unlock-causing rotation direction U1 using the operation member so as to slidingly move the lock gear members 3 in the unlock direction U2 to release the locked state, and then the seat back is inclined rearwardly.

When the seat back reaches the rearwardmost inclined position, the rearwardmost-inclination stopper portion 6c of the stopper plate 6 is brought into contact with the rearwardmost-inclination stopper protrusion 1g of the guide bracket 1.

FIGS. 9A and 9B are front views showing the reclining mechanism set as the type designed to keep the seat back from being locked at the forwardmost inclined position, wherein FIG. 9A shows the reclining mechanism in a state when the seat back is at the forwardmost inclined position, and FIG. 9B shows the reclining mechanism in a state when the seat back is at the initial locked position (e.g., upright position) where it is initially locked after being inclined rearwardly from the forwardmost inclined position.

In this type, the first free-zone arc portion 2f having an arc length greater than that of the second free-zone arc portion 2g is used. As the seat back is inclined forwardly from a rearwardly inclined position, the internal gear member 2 is rotated. Then, when the seat back reaches the forwardmost inclined position (the state illustrated in FIG. 9A), the protrusion 3c is still placed on the first free-zone arc portion 2f. Thus, in this type, the seat back is not locked at the forwardmost inclined position. The remaining operations are the same as those in the type designed to lock the seat back at the forwardmost inclined position, and their description will be omitted.

Figure 10:
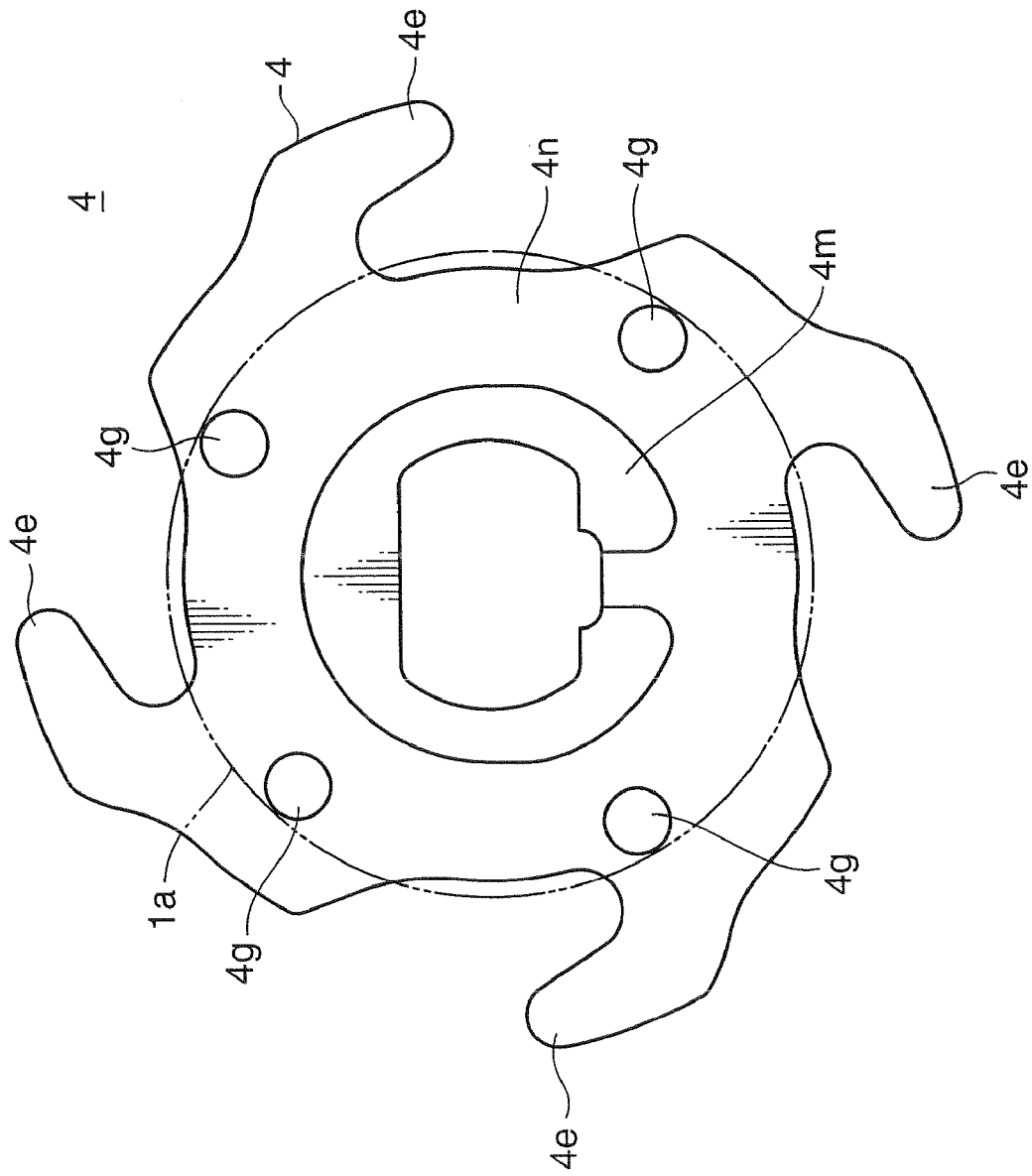
FIG. 10 is a local front view showing a reclining mechanism as a first modification of the embodiment illustrated in FIG. 1

In the reclining mechanism according to the above embodiment, the fitting boss 4c formed on the rotatable cam 4 is fitted in the fitting hole 1a formed in the guide bracket 1. Alternatively, as shown in FIG. 10, the rotatable cam 4 may be configured to have a plurality of (in this modification, four) shaft-shaped protrusions 4g formed at positions to be in contact with the inner peripheral surface of the fitting hole 1a, wherein the protrusions 4g are fitted in the fitting hole 1a. In this case, as long as each of the protrusions 4g is located on a common circle having a center on a rotation axis of the rotatable cam 4 (i.e., on the rotation axis of the internal gear member 2), the protrusions 4g are not necessarily arranged at even intervals. Alternatively, in place of the plurality of protrusions, a disk-shaped raised portion having an outer peripheral surface fittable in the inner peripheral surface of the fitting hole 1a as indicated by the two-dot chain line in FIG. 10 may be formed, wherein the raised portion is fitted in the fitting hole 1a.

In place of the structure adapted to be fitted in the fitting hole 1a, a recess 1h adapted to come into circumscribing contact with the engagement pawls 4e of the rotatable cam 4 may be formed in the inner surface of the guide bracket 1, wherein respective outer peripheral portions of the engagement pawls 4e of the rotatable cam 4 are fitted in an inner peripheral surface of the recess 1h, as shown in FIGS. 11A and 11B. In this manner, an outer peripheral portion of the rotatable cam 4 is fitted in the fitting recess 1h, so that the rotatable cam 4 can be stably rotated in its fitted state.

Figures 12A, 12B:
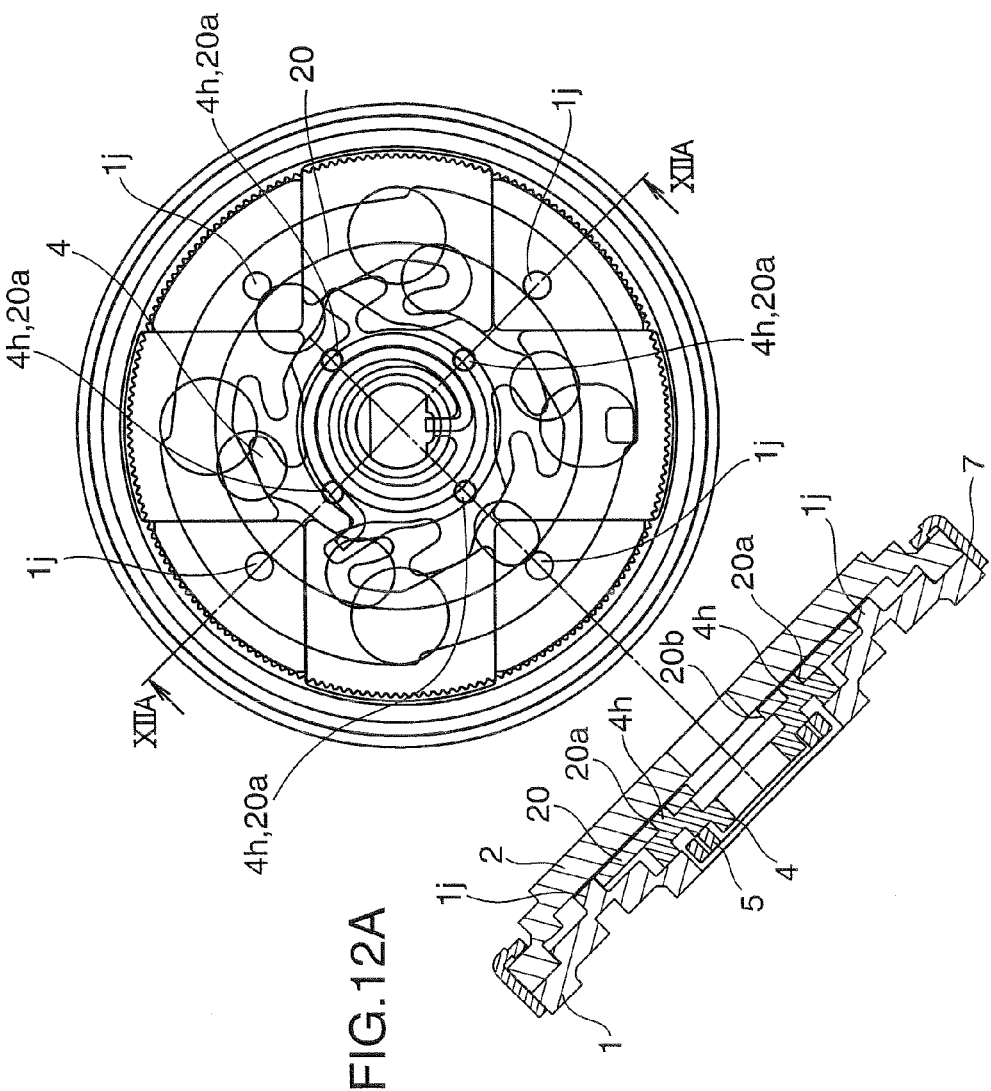
FIG. 12A is a sectional view showing a reclining mechanism as a third modification of the embodiment illustrated in FIG. 1, taken along the line XIIA-XIIA in FIG. 12B.
FIG. 12B is a see-through front view showing the mechanism as the third modification, when viewed from the side of an internal gear member.

Further, in place of the structure adapted to be fitted in the fitting hole 1a, a plurality of (in this modification, four) shaft-shaped protrusions 1j may be formed on the inner surface of the guide bracket 1 in such a manner as to come into contact with an outer peripheral surface of a circular plate 20 which is formed with a plurality of engagement holes 20a and a center hole 20b, and disposed between the guide bracket 1 and the internal gear member 2, as shown in FIGS. 12A and 12B. In this case, the rotatable cam 4 is formed with a plurality of (in this modification, four) shaft-shaped protrusions 4h. The protrusions 4h are inserted into the respective engagement holes 20a of the circular plate 20 to allow the circular plate 20 to be integrated with the rotatable cam 4. The operation member is inserted into the center hole 20b of the circular plate 20. As long as each of the protrusions 1j is located on a circle concentric with the circular plate 20, the protrusions 1j are not necessarily arranged at even intervals. In this manner, the circular plate 20 integral with the rotatable cam 4 is fitted inside the protrusions 1j, so that the rotatable cam 4 can be stably rotated in its fitted state.

While the above embodiment has been described based on one example where the guide bracket and the internal gear member are mounted, respectively, to the seat cushion and the seat back, the internal gear member and the guide bracket may be mounted, respectively, to the seat cushion and the seat back.

Further, while the above embodiment has been described based on one example where the four lock gear members are arranged, the number of the lock gear members may be two or three or may be five or more.

The above embodiment may be summarized as follows.

According to one aspect of the present invention, there is provided a seat reclining mechanism designed to be mounted to a seat cushion and a seat back so as to allow the seat back to be reclined. The seat reclining mechanism comprises: a guide bracket adapted to be mounted to either one of the seat cushion and the seat back; an internal gear member adapted to be mounted to a remaining one of the seat cushion and the seat back, wherein the internal gear member is coupled to the guide bracket in a rotatable manner about a rotation axis thereof with respect to the guide bracket, and formed with internal teeth along a circle having a center on the rotation axis; a plurality of lock gear members disposed between the guide bracket and the internal gear member to extend radially from the rotation axis, wherein each of the lock gear members is formed with external teeth meshingly engageable with the internal teeth, and supported by the guide bracket in such a manner as to be slidable in both a lock direction causing the external teeth to be brought into meshing engagement with the internal teeth and an unlock direction causing the external teeth to be released from the meshing engagement with the internal teeth; a fitting portion provided in either one of the guide bracket and the internal gear member; a rotatable cam rotatably supported by the fitting portion, and adapted to be rotatable in both a lock-causing rotation direction causing the lock gear members to be slidingly moved in the lock direction and an unlock-causing rotation direction causing the lock gear members to be slidingly moved in the unlock direction; and a lock spring biasing the rotatable cam in the lock-causing rotation direction.

In the seat reclining mechanism of the aspect of the present invention, the rotatable cam is fitted in (roughly guided by) the fitting portion provided in either one of the guide bracket and the internal gear member, so that the rotatable cam is rotatably supported within the reclining mechanism. This makes it possible to stably perform a lock/unlock operation between the guide bracket and the internal gear member. In addition, a centering function is incorporated in the reclining mechanism to eliminate a need for an operation rod and a bearing member with a high degree of dimensional accuracy, so that centering of the rotatable cam can be achieved at a low cost.

Preferably, the fitting portion comprises a fitting hole formed in either one of the guide bracket and the internal gear member, and the rotatable cam has a fitting boss adapted to be fitted into the fitting hole.

According to this feature, the fitting boss of the rotatable cam is fitted in the fitting hole. This makes it possible to stably rotate the rotating cam in its fitted state.

Preferably, the fitting boss has an annular-shaped boss body, and a plurality of protrusions which protrude radially from the boss body toward an inner peripheral surface of the fitting hole to come into slide contact with the inner peripheral surface.

According to this feature, a total diameter of the plurality of protrusions can be increased while minimizing a diameter of the boss body of the fitting boss, so as to more stably rotate the rotating cam in its fitted state.

Alternatively, the fitting portion may comprise a fitting recess formed in either one of the guide bracket and the internal gear member, and the rotatable cam has an outer peripheral portion fitted into the fitting recess.

According to this feature, the outer peripheral portion of the rotatable cam is fitted in the fitting recess. This makes it possible to stably rotate the rotating cam in its fitted state.

Preferably, the seat reclining mechanism of the aspect of the present invention further comprises a circular plate disposed between the guide bracket and the internal gear member, and integrated with the rotatable cam, wherein the fitting portion is formed in either one of the guide bracket and the internal gear member to have a plurality of protrusions disposed along an outer periphery of the circular plate.

According to this feature, the circular plate integrated with the rotatable cam is fitted inside the plurality of protrusions. This makes it possible to stably rotate the rotating cam in its fitted state.

Preferably, in the seat reclining mechanism of the aspect of the present invention, the rotatable cam has a cam body, and a plurality of engagement pawls disposed on a circumference of a circle having a center on the rotation axis and each formed to protrude from the cam body in the lock-causing rotation direction or the unlock-causing rotation direction, and the plurality of lock gear members are formed, respectively, with a plurality of engagement grooves engageable with respective ones of the plurality of engagement pawls, wherein, when the rotatable cam is rotated in the lock-causing rotation direction, the engagement pawls push the respective engagement grooves in the lock direction to allow the lock gear members to be slidingly moved in the lock direction, and, when the rotatable cam is rotated in the unlock-causing rotation direction, the engagement pawls pull the respective engagement grooves in the unlock direction to allow the lock gear members to be slidingly moved in the unlock direction.

According to this feature, when the rotatable cam is rotated in the lock-causing rotation direction, the engagement pawls push the respective engagement grooves in the lock direction, so that the lock gear members are slidingly moved in the lock direction. Thus, the external teeth are brought into meshing engagement with the internal teeth. Then, when the rotatable cam is rotated in the unlock-causing rotation direction, the engagement pawls are brought into engagement with respective engagement grooves in such a manner as to pull the engagement grooves in the unlock direction, so that the lock gear members are slidingly moved in the unlock direction. Thus, the external teeth are moved apart from the internal teeth to release the meshing engagement between the external teeth and the internal teeth. This makes it possible to eliminate a conventional need for providing a circular lever (actuating plate) for moving the lock gear members in the unlock direction, as a separate component, so as to facilitate a reduction in cost. In addition, the reclining mechanism can be reduced in overall thickness by eliminating the circular lever.

The invention claimed is:

1. A seat reclining mechanism designed to be mounted to a seat cushion and a seat back so as to allow said seat back to be reclined, said seat reclining mechanism comprising:
   a guide bracket adapted to be mounted to either one of said seat cushion and said seat back;
   an internal gear member adapted to be mounted to a remaining one of said seat cushion and said seat back, said internal gear member being coupled to said guide bracket in a rotatable manner about a rotation axis thereof with respect to said guide bracket, and formed with internal teeth along a circle having a center on said rotation axis;
   a plurality of lock gear members disposed between said guide bracket and said internal gear member to extend radially from said rotation axis, each of said lock gear members being formed with external teeth meshingly engageable with said internal teeth, and supported by said guide bracket in such a manner as to be slidable in both a lock direction causing said external teeth to be brought into meshing engagement with said internal teeth and an unlock direction causing said external teeth to be released from the meshing engagement with said internal teeth;
   a fitting portion provided in either one of said guide bracket and said internal gear member;
   a rotatable cam rotatably supported by said fitting portion, and adapted to be rotatable in both a lock-causing rotation direction causing said lock gear members to be slidingly moved in said lock direction and an unlock-causing rotation direction causing said lock gear members to be slidingly moved in said unlock direction; and
   a lock spring biasing said rotatable cam in said lock-causing rotation direction,
   wherein:
   said fitting portion comprises a fitting hole formed in said either one of said guide bracket and said internal gear member,
   said rotatable cam has a fitting boss adapted to be fitted into said fitting hole,
   said fitting boss has an annular-shaped boss body, and a plurality of protrusions that protrude radially from said boss body toward an inner peripheral surface of said fitting hole to come into sliding contact with said inner peripheral surface.

2. The seat reclining mechanism as defined in claim 1, wherein:

said rotatable cam has a cam body, and a plurality of engagement pawls disposed on a circumference of a circle having a center on said rotation axis and each formed to protrude from said cam body in said lock-causing rotation direction or said unlock-causing rotation direction; and said plurality of lock gear members are formed, respectively, with a plurality of engagement grooves engageable with respective ones of said plurality of engagement pawls, wherein, when said rotatable cam is rotated in said lock-causing rotation direction, said engagement pawls push said respective engagement grooves in said lock direction to allow said lock gear members to be slidingly moved in said lock direction, and, when said rotatable cam is rotated in said unlock-causing rotation direction, said engagement pawls pull said respective engagement grooves in said unlock direction to allow said lock gear members to be slidingly moved in said unlock direction.

* * * * *